United States Patent [19]

Konsetov et al.

[11] 4,198,383
[45] Apr. 15, 1980

[54] APPARATUS FOR CONTINUOUS PREPARATION OF ACRYLONITRILEBUTADIENSTYRENE COPOLYMER

[76] Inventors: Vitaly V. Konsetov, prospekt Energetikov, 34, kv. 55; Galina I. Kozlova, prospekt Kosmonavtov, 52, korpus 6, kv. 55; Valentina G. Orlova, prospekt Metallistov, 69, kv. 7; Ljudmila F. Dokukina, Novocherkassky prospekt, 32/15, kv. 261; Galina M. Deryagina, prospekt Energetikov, 34, kv. 69; Tatyana N. Pavlova, Kharkovskaya ulitsa, 8, kv. 4; Eleonora A. Gavrichenkova, ulitsa Mayakovskogo, 11, kv. 74; Natalia P. Vasilieva, ulitsa Stasovoi, 6, kv. 24, all of Leningrad, U.S.S.R.

[21] Appl. No.: 935,086

[22] Filed: Aug. 21, 1978

[51] Int. Cl.² ............................................. B01J 1/00
[52] U.S. Cl. ................................ 422/134; 366/279; 366/305; 422/135; 422/228; 526/65
[58] Field of Search ............... 422/131, 134, 135, 138, 422/225, 227, 228; 526/65, 920; 366/279, 302, 305, 307; 260/880

[56] References Cited

U.S. PATENT DOCUMENTS

| 2,169,339 | 8/1939 | Ditto | 366/305 |
|---|---|---|---|
| 3,362,793 | 1/1968 | Massoubre | 422/135 |
| 3,386,809 | 6/1968 | Massoubre | 422/135 |
| 3,424,733 | 1/1969 | Pollock | 422/138 X |
| 3,438,743 | 4/1969 | Grunewald et al. | 422/225 X |
| 3,513,145 | 5/1970 | Crawford | 422/135 X |
| 3,679,651 | 7/1972 | Toshimichkii et al. | 422/138 X |
| 3,700,631 | 10/1972 | Siclari et al. | 526/65 X |
| 3,851,014 | 11/1974 | Dalton | 260/880 R X |
| 4,115,369 | 9/1978 | Sugio et al. | 526/65 |
| 4,122,135 | 10/1978 | Valoti et al. | 260/880 R |

*Primary Examiner*—R. E. Serwin
*Assistant Examiner*—Roger F. Phillips
*Attorney, Agent, or Firm*—Haseltine, Lake & Waters

[57] ABSTRACT

Method and apparatus for continuous preparation of an acrylonitrilebutadienestyrene copolymer comprises on-stream mounted: a prepolymerization reactor, a polymerization reactor, a reactor for the final polymerization and an apparatus for the removal of the non-polymerized monomers from the reaction mass. The polymerization reactor contains a stirring means which has a tube fixedly mounted coaxially with a shell and a mixing member disposed inside the tube. The stirring member is embodied in the form of a closed cylinder. At least one slot is provided in the tube wall. This slot is extending over the entire length of the tube. In the reactor there is also a partition positioned between the reactor shell wall and the stirring member. The partition is passing through the middle of the slot and intended for division of the reactor shell cavity into a suction zone and a pumping zone. Upon rotation of the stirring member there is effected a repeated circulation of the reaction mass within the reactor shell cavity in planes perpendicular to the longitudinal axis thereof.

The present invention makes it possible to carry out the intermediate polymerization process at a constant composition of the reaction mass and a constant degree of conversion of the monomers and to obtain copolymers with various predetermined properties.

1 Claim, 3 Drawing Figures

APPARATUS FOR CONTINUOUS PREPARATION OF ACRYLONITRILEBUTADIENSTYRENE COPOLYMER

The present invention relates to chemical industry and more specifically to a method for a continuous preparation of an acrylonitrilebutadienestyrene copolymer and to an apparatus for realization of said method.

The present invention may be most advantageously used in the preparation of graft-copolymers of styrene and acrylonitrile on a polybutadiene rubber by way of a continuous bulk-polymerization.

Such copolymers are extensively used as structural materials in the manufacture of components and housings of radio and television sets, telephone apparatus, type-writers and calculators, as well as for inner lining of refrigerator cabinets, as automobile components, in the manufacture of tubes and for some other applications.

The present invention is also useful for the preparation of copolymers on the basis of other monomers such as vinyltoluene or alpha-methylstyrene and methylmethacrylate as well as for the production of impact-resistant polystyrene.

Currently employed for the manufacture of an acrylonitrilebutadienestyrene copolymer are mainly discontinuous block-suspension or emulsion polymerization methods, the latter emulsion method may be also continuous.

These methods provide a wide range of such products of rather high quality and with a broad spectrum of physicomechanical properties.

However, the use of said emulsion-polymerization method necessitates large amounts of water in the stage of polymerization and washing of the resulting polymer powder as well as high costs of purification of waste waters. Furthermore, large capital investments are necessary for such operations for recovery of the polymer from the reaction mass as filtration, washing, drying and extrusion of a finely-dispersed product. The use of auxiliary agents such as emuldifiers, stabilizers, coagulation agents, surfactants results in the formation of the desired product with a large amount of impurities which are impossible to be completely removed even after a repeated washing. The presence of said impurities does not enable the use of the thus-prepared polymers for the purpose of packaging materials contacting with food products.

The bulk-polymerization method is the most preferable both from the standpoint of purity of the final product and from economic considerations. In the bulk-polymerization method use is made of initiators, stabilizing agents and, in some cases, of a small amount of a solvent. The resulting product has a lower content of impurities. Such stages as recovery of the product from the reaction mass are exluded since the final polymerizate is in the form of a melt which can be readily processed to granules suitable for a further processing to articles. For this reason, the method for the preparation of an acrylonitrilebutadienestyrene copolymer by bulk-polymerization is the most economically efficient, though its emplementation is encountered with certain specific difficulties.

It is a particular feature of the bulk-polymerization method for the preparation of said copolymers resides in a continuous increasing of viscosity of the reaction mass from a low-viscosity solution of the rubber to a very viscous melt of the copolymer. Furthermore, in the preparation of the acrylonitrilebutadienestyrene copolymer the incoporation of the second monomer, i.e. acrylonitrile, results in increase of heat evolved in the polymerization and, hence, to a further increase of viscosity of the reaction mass. For this reason, in performing said method preparation of said copolymers by bulk-polymerization, the main difficulty resides in the necessity of a rapid removal of excessive polymerization heat from the reaction zone under the conditions of a high viscosity.

Therefore, in the process of preparation of acrylonitrilebutadienestyrene copolymers the greatest difficulty resides in maintaining a constant temperature in the polymerization zone and a constant composition of the reaction mass which defines the composition of the resulting copolymers, the structure thereof and, hence, quality of the final product.

Well known in the art is a method for the preparation of acrylonitrilebutadienestyrene copolymers by bulk-copolymerization. To commercially implement this process, first prepared is a solution of the rubber in a mixture of monomers, i.e. styrene and acrylonitrile. Then the resulting mixture is subjected to pre-polymerization at a temperature within the range of from 70° to 100° C. to a degree of conversion of the monomers of from 25 to 40%. The resulting reaction mass referred to hereinafter as a pre-polymer is cooled to a temperature of from 30° to 33° C., whereafter it is fed to an intermediate polymerization. The cooled pre-polymer is in this case a cooling agent for the stage of the intermediate polymerization.

Afterwards, from the reaction mass brought to a degree of conversion of the monomers of 60–80% at the stage of intermediate polymerization performed at a temperature within the range of from 120° to 160° C. a portion of the un-polymerized monomers is removed. Then the reaction mass is fed to the stage of the final polymerization which is performed over a period of from 5 to 6 hours at a temperature within the range of from 190° to 220° C. to achieve the degree of conversion of the monomers of 90%. Then the remaining portion of the un-polymerized monomers is removed from the melt and the latter is subjected to granulation.

Difficulties associated with the realization of this prior art method are associated with that in the first place the prepolymer coming from the heat exchanger and the reaction mass found in the polymerization reactor have a great temperature gradient, which may lead to the obtaining of a polymer with a broad mass-molecular distribution, and also to lowering of the polymerization rate owing to non-uniform distribution of temperatures over the height of the polymerization reactor.

In the second place, the control of the polymerization reactor, in which removal of polymerization heat is effected by feeding cooled prepolymer, is rendered difficult because of inadequate effectiveness of the heat removal system when the solution is cooled down to the temperature cited in said Patent.

Said prior art method does not ensure sufficiently high qualities of the resulting copolymer. This is due to the fact that the reaction mass is maintained for a long time (5 to 6 hours) at a high temperature (180°–220° C.) which inevitably causes destruction of the copolymer, i.e. breaking of its structure created at the stage of pre-polymerization.

Also well known in the art is a continuous process for the production of acrylonitrilebutadienestyrene copolymer, wherein first prepared is a solution of the rubber in a mixture of the monomers. Then pre-polymerization is carried out in the mass of the thus-prepared solution to a degree of conversion of the monomers of from 25 to 40% at a temperature within the range of from 130° to 160° C.

Thereafter, an intermediate polymerization is effected to a degree of conversion of the monomers of from 65 to 70% at a temperature within the range of from 140° to 160° C. and the final polymerization to a degree of conversion of from 70 to 90% at a temperature within the range of from 140° to 185° C. The final stage comprises the removal of the non-polymerized monomers from the melt and granulation of said melt.

Cooling of the reaction mass in the stage of polymerization is effected by evaporation of the monomers.

Though this method allows to overcome such disadvantages as the difficulty of maintaining a constant temperature inside the polymerization reactor and practically excludes the possibility of clogging of pipelines and pumps as in the above-described prior art method, it, nevertheless, has its own disadvantages.

The principal disadvantage resides in that the ratio between the components in the reaction mass is not kept constant, since upon cooling by evaporation the resulting vapours are enriched with a more volatile component (in the present case acrylonitrile), whereas in the reaction mass the content of acrylonitrile is decreased. This phenomenon causes permanent variations of the composition of the resulting copolymer and, hence, to impaired physico-mechanical characteristics of the final product.

To maintain constant predetermined composition of the reaction mass, it could be possible to add the lacking amount of acrylonitrile directly into the reaction mass at the stage of polymerization. This, however, does not bring about the expected result due to a poor miscibility of the high-viscous reaction mass and a low-viscous monomer, i.e. acrylonitrile; therefore, the newly added acrylonitrile cannot be uniformly distributed within the whole reaction volume.

Well known is an apparatus for a continuous polymerization of styrene or a mixture thereof with comonomers in mass under isothermal conditions, i.e. under the conditions of constant temperature in the polymerization reactor.

This prior art apparatus consists of a pre-polymerization reactor, reactors of polymerization and a vessel for the removal of the unpolymerized monomers.

The completely filled polymerization reactor comprises a jacketed shell. Inside the shell there are provided a stirring means and heat-exchanging surfaces.

The stirring means comprises a vertical screw rotating in a tube fixedly mounted along the reactor axis.

The reaction mass is fed into this reactor from the bottom and passed into the stirring space inside the tube. A portion of the reaction mass is discharged out of an outlet opening located at the upper zone of the reactor. The major portion of the reaction mass is moved downwardly between the tube and the reactor shell wall, mixed with the fed pre-polymer and again recycled. To maintain constant temperature, the pre-polymer supply into the polymerization reactor, the rate of discharging of the reaction mass from the polymerization reactor and circulation of the reaction mass inside the reactor are adjusted so that the reaction mass is recycled for 30–50 times within the reactor prior to being discharged therefrom.

Said apparatus operates as a mixing reactor and is used for polymerization of styrene or a mixture thereof with comonomers. For rubber-containing copolymers such as acrylonitrilebutadienestyrene copolymer such reactor cannot be used as a polymerization reactor.

This apparatus has a disadvantage residing in that during its operation high shear stresses of a very viscous reaction mass are originated, especially in the screw zone. This brings about impaired physico-mechanical characteristics of the final product, since the copolymer structure is broken i.e. the size of the rubber particles distributed within the copolymer with acrylonitrile is charged.

Another essential disadvantage of the screw-type mixing means resides in that it creates an intensive circulation of the reaction mass only in the case where this reaction mass has a high viscosity. However, during the continuous polymerization the space between the stationary tube and the screw may be filled with the fed prepolymer having a much lower viscosity than the reaction mass in the polymerization reactor. For this reason, the rate of circulation of the reaction mass in the polymerization reactor is substantially decreased.

To bring the rate of circulation of the reaction mass to the predetermined value, it is necessary to increase rotation speed of the stirring means. This again results in an increased shear stress of the reaction mass, wherefore the copolymer structure will be further destroyed.

Such broken structure of the copolymer will result in impaired physico-mechanical properties and appearance of the final product.

It is the main object of the present invention to provide such a method for a continuous preparation of an acrylonitrilebutadienestyrene copolymer, wherein said intermediate polymerization is effected so as to ensure the possibility of maintaining constant temperature of the reaction mass during the intermediate polymerization.

It is another important object of the present invention to provide such an apparatus, wherein the polymerization reactor has such an arrangement of the stirring means that would enable maintaining constant temperature of the reaction mass during the intermediate polymerization.

It is still another object of the present invention to provide a method and an apparatus for a continuous preparation of an acrylonitrilebutadienestyrene copolymer which would enable the production of the copolymers with various predetermined properties.

This object is accomplished by a method for a continuous preparation of an acrylonitrilebutadienestyrene copolymer involving a radical-type bulk prepolymerization of a solution of the rubber in a mixture of monomers, i.e. styrene and acrylonitrile, to obtain a reaction mass with a degree of conversion of the monomers substantially of from 25 to 40%, an intermediate polymerization of the resulting reaction mass in a polymerization reactor to a degree of conversion of substantially from 60 to 80% simultaneously within mixing thereof, the final polymerization to a degree of conversion of substantially from 75 to 90% and the removal of the nonpolymerized monomers from the reaction mass, wherein, in accordance with the present invention, temperature of the reaction mass during the polymerization is maintained constant over the entire volume of the polymerization reactor, wherefor mixing of the reaction mass in the polymerization reactor is effected by way of a forced multiple circulation thereof in planes perpendicular to the longitudinal axis of the reactor.

This object is accomplished also by an apparatus for realization of said method containing on-stream mounted and connected by means of pipelines for passing the reaction mass therethrough: a pre-polymerization reactor, a polymerization reactor, a reactor for the final polymerization and a vessel for the removal of the non-polymerized monomers from the reaction mass; inside the shell of the polymerization reactor there are placed heat-exchanging members and a means for agitation of the reaction mass having a fixedly-mounted tube positioned coaxially with the polymerization reactor shell and a rotably mounted stirring member positioned within said tube; in accordance with the present invention said stirring member being made in the form of a closed cylinder with at least one slot provided in the tube wall and extending over the entire length of the tube and at least one partition positioned between the reactor shell wall and the stirring member and intended for division of the cavity of the polymerization reactor shell into a suction zone and pumping zone for effecting circulation of the reaction mass within the cavity of the polymerization reactor shell, whereby during rotation of the stirring member a repeated circulation of the reaction mass is effected within the cavity of the polymerization reactor in planes perpendicular to the longitudinal axis thereof.

Owing to such an arrangement of the stage of intermediate polymerization according to the method of the present invention it has become possible to conduct polymerization at a constant temperature and degree of conversion of the monomers with a uniform composition of the reaction mass with a high stability of these parameters.

The copolymers prepared in accordance with the present invention feature stable satisfactory properties.

Furthermore, in the reactor of intermediate polymerization there are no stagnation zones in the reaction mass or clogging thereof onto the walls of various structural members, despite the fact that the reaction mass at a degree of conversion of the monomers of from 60 to 80% has a very high viscosity. Absence of stagnation zones and clogging makes it possible to continuously perform the process of preparation of the copolymers for substantially any desired period of time.

Moreover, the above-described embodiment of the polymerization stage according to the present invention makes it possible to produce copolymers with different properties; for example, it is possible to prepare injection-moulding grades with an increased resilience at a medium flowability; as well as extrusion-moulding grades with a high relative elongation. Polymerization in a fully filled reactor, i.e. without a gas phase, occurs at a constant composition of the reaction mass being polymerized and results in the preparation of copolymers with a constant predetermined ratio between styrene and acrylonitrile which is especially important for the production of copolymers with good physico-mechanical characteristics.

Besides, the use of the method and apparatus according to the present invention makes it possible to perform the intermediate polymerization at relatively low temperatures, since the stirring means operates with a sufficient efficiency even at high viscosities of the polymerization mass.

Given hereinbelow is a description of a specific embodiment of a method for a continuous preparation of an acrylonitrilebutadienestyrene copolymer with reference to the accompanying drawings, wherein:

FIG. 1 schematically shows an apparatus for realization of a continuous process for the preparation of an acrylonitrilebutadienestyrene copolymer;

In practice of the method of the present invention first prepared is a solution of the rubber in a mixture of monomers styrene and acrylonitrile and a solvent-ethylbenzene. Into the thus-prepared solution of the rubber there are introduced radical-forming peroxide initiators such as benzoyl peroxide, tert.butyl diperoxide or tert.butyl perbenzoate. Then the starting solution is fed into the reactor for prepolymerization. The process is conducted at a temperature within the range of from 80° to 120° C. to a degree of conversion of the monomers of from 25 to 40%.

The resulting prepolymer is fed into the polymerization reactor, wherein the process is conducted at a temperature within the range of from 120° to 150° C. to a degree of conversion of the monomers of from 60 to 80%. Then the reaction mass is fed into the final-polymerization reactor, wherein a degree of conversion of the monomers is brought to 75-90% at a temperature within the range of from 160° to 180° C.

On completion of the reaction of the final polymerization the reaction mass is passed into the vessel for the removal of the non-polymerized monomers and the solvent which is effected at a temperature within the range of from 220° to 230° C. under a pressure of from 15 to 20 mm Hg.

The resulting polymer is then passed in the form of strands to granulation.

The final product is tested for the following properties: Izod impact strength; relative elongation; melt index; ratio of the content of styrene and acrylonitrile.

As the monomers in accordance with the present invention use may be made of: vinyltoluene, alpha-methylstyrene, methyl -methacrylate. As the rubber use may be made of butadiene rubber of various structure and composition as well as of butadiene-styrene rubber.

As a solvent employed for lowering viscosity of the reaction mass use is made of aromatic hydrocarbons such as ethylbenzene, benzene, toluene, xylene.

As the radical-foroming peroxide initiators employed in accordance with the present invention use is made of benzoyl peroxide, tert.butyl di-peroxide, tert.butyl perbenzoate.

In the following Table 1 there are given possible proportions of the components for the preparation of the starting solution of the rubber in a mixture of the monomers, solvent and radical-forming initiators expressed in weight percent per 100 parts by weight of the total of the monomers.

Table 1

| Starting components | Amount, wt. % |
| --- | --- |
| styrene (vinyl-toluene, alpha-methylstyrene) | 70 to 90 |
| acrylonitrile, methylmethacrylate | 30 to 10 |
| rubbers | 5 to 25 |
| aromatic solvents | 15 to 20 |
| radical-forming initiators | 0. to 0.5 |

The method according to the present invention is further described in details with reference to the apparatus for its realization and operation of said apparatus.

Figure 1:
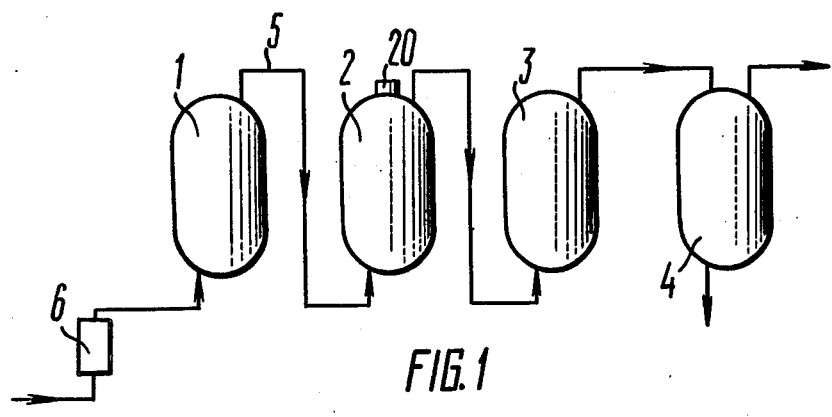

The apparatus intended for performing the continuous process of the preparation of an acrylonitrilebutadienestyrene copolymer comprises a reactor 1 (FIG. 1) for pre-polymerization, a polymerization reactor 2, a reactor 3 for the final polymerization and a vessel 4 for the removal of the non-polymerized monomers.

These reactors are mounted on-stream and communicated therebetween by means of pipelines 5, wherethrough the reaction mass is passed by means of a pump 6 mounted before the reactor 1. The pump 6 is of any suitable arrangement.

Figure 2:
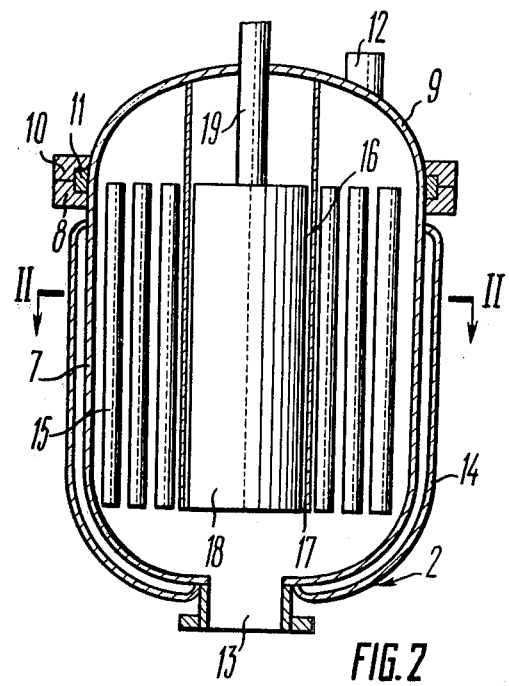
FIG. 2 shows an enlarged elevation view of the polymerization reactor.

The polymerization reactor 2 has a shell 7 (FIG. 2) with a cylindrical side surface. At the top of the shell 7 has a flange 8 and hermetically sealed by means of a cover 9 fixed with its flange 10 to the flange 8 of the shell 7. Between the flanges 8 and 10 there is provided a sealing annular gasket 11 tightly adherent to the shell 7 in the joint with the cover 9. An outlet pipe 12 is provided in the cover 9 for discharging the reaction mass therethrough.

In the lower part of the shell 7 there is an inlet pipe 13 for charging the reaction mass into the shell 7; said inlet pipe being coaxially mounted with the longitudinal axis of the shell 7.

From the outside the shell 7 is surrounded by a jacket 14 rigidly fixed thereto and intended to cool the shell by means of a cooling agent circulating therethrough.

Inside the shell 7 there are heat-exchange elements 15 made as tubes and adapted to remove excess heat, evolving in the course of the polymerization reaction, with the aid of a cooling agent circulating therethrough.

Inside the shell 7 there is also a means 16 for stirring the reaction mass. The means 16 contains a stationary tube 17 positioned coaxially with the shell 7 (FIGS. 1 and 2) and having a circular cross-section. The tube 17 is rigidly secured to the cover 9.

Inside said stationary tube 17 a stirring member 18 is mounted coaxially thereto and to the shell 7; this stirring member in accordance with the present invention is embodied in the form of a closed cylinder denoted with the same reference character 18 and having a circular cross-section.

The upper end of the cylinder 18 is provided with a rod 19 protruding through the cover 9 outside the shell 7 and connected with a driving means 20 (FIG. 1) setting the cylinder 18 into rotation.

The driving means 20 is of any suitable arrangement which does not constitute a subject matter of the present invention.

Figure 3:
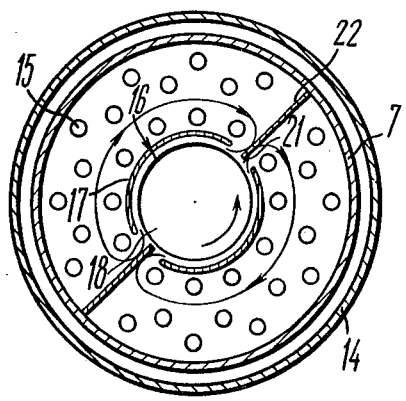
FIG. 3 shows the same reactor, cross-section II—II.

In accordance with the present invention in the wall of the tube 17 there are two slots 21 (FIG. 3) extending vertically along the entire length of the tube 17 and located symmetrically relative to the axis of the polymerization reactor.

In the shell 7, in accordance with the present invention there are two partitions 22 positioned vertically between the wall of the shell 7 and the cylinder 18. Each partition 22 passes substantially through the middle of each slot 21 and rigidly secured with one side thereof to the wall of the shell 7, while the opposite side is in the close vicinity to the side surface of the cylinder 18 at the minimal distance therefrom defined by the requirement of a free rotation of the cylinder 18.

Partitions 22 divide the cavity of the shell 7 into zones of suction and pumping of the reaction mass. Therewith, one half of each slot 21 acts as a suction opening while the other half acts as a pumping opening.

In each half of the cavity of the shell 7 the suction zone adjacent to one side of the partition 22 is passing into the pumping (pressure) zone adjacent to one side of the other partition 22.

As a result of such embodiment of the apparatus according to the present invention, during rotation of the cylinder 18 there occurs a repeated multiple circulation of the reaction mass within the cavity of the shell 7 in planes perpendicular to the axis of the polymerization reactor.

The embodiment of the polymerization reactor 2 according to the present invention makes it possible to effect an intensive agitation of a viscous reaction mass as well as to maintain a constant temperature of the reaction mass over the whole volume of the reactor 2 with the accuracy of $\pm 1°$ C.

Furthermore, this stirring means 16 makes it possible to avoid great non-uniform shear stresses of a very viscous reaction mass in the clearance between the tube 17 and stirring member 18. For this reason, the reaction mass in the polymerization reactor is not subjected to a mechanical destruction, i.e. the size of rubber particles distributed within the copolymer of styrene with acrylonitrile is not changed during the polymerization.

The method for a continuous preparation of an acrylonitrilebutadienestyrene copolymer in accordance with the present invention is effected in the apparatus functioning in the following manner.

A preliminary prepared solution of the rubber in a mixture with monomers (styrene and acrylonitrile) added with a solvent (ethylbenzene) and radical-forming initiators (benzoyl peroxide, tert.butyl diperoxide or tert.butyl perbenzoate) is pumped, from its source, by means of a pump 6 via a line 5 into a pre-polymerization reactor 1, wherein pre-polymerization of the prepared rubber solution is effected at a temperature within the range of from 80° to 120° C. to a degree of conversion of the monomers of 25 to 40%.

Then the pre-polymer is passed via a line 5 and an inlet pipe 13 into a polymerization reactor 2. Upon rotation of a stirring member 18 effected from a driving means 20 the reaction mass is sucked, through one half of a slot 21, into the clearance between the stirring member 18 and a stationary tube 17 and pushed out through the other half of the slot 21. In this manner a pumping effect of the stirring means 16 is achieved. Owing thereto, in the shell 7 of the reactor 2 there occurs an intensive circulation of the reaction mass in planes perpendicular to the axis of the reactor 2 as shown by arrows in FIG. 3. Furthermore, the reaction mass in the polymerization reactor 2 is moving upwardly due to a continuous supply of the pre-polymer into the reactor 2 and withdrawn from the reactor 2 through an outlet pipe 12. Therewith, in the reactor 2 there is no mixing of the reaction mass in the downward direction, i.e. it functions as a completely filled mixing reactor. Removal of the excessive heat formed during the polymerization reaction is effected by supplying a cooling agent into a jacket 14 of the polymerization reactor 2 and heat-exchanging members 15. The heat-exchanging members 15 are made in the form of tubes and uniformly distributed inside the whole of the cavity of the polymerization reactor 2 between the shell wall 7 and the stationary tube 17.

In the polymerization reactor 2 the reaction mass has a degree of conversion of the monomers as high as 60-80% at a temperature within the range of from 120° to 150° C.

Then the reaction mass is supplied, via the line 5, to the reactor 3 of the final polymerization wherein it reaches a degree of conversion of the monomers of from 70 to 90% at a temperature within the range of from 160° to 180° C. Afterwards, the reaction mass is fed, via the line 5, into the vessel 4 for the removal of the non-polymerized monomers and the solvent. The removal is effected at a temperature within the range of from 180° to 220° C. under a residual pressure of from 15 to 20 mm Hg.

The method and apparatus for the preparation of an acrylonitrilebutadienestyrene copolymer according to the present invention make it possible to conduct the polymerization process at a constant temperature over the entire volume of the polymerization reactor 2 and at a constant degree of conversion of the monomers.

The copolymers prepared by this method have stable, rather high physico-mechanical properties.

Some specific Examples illustrating the method and apparatus according to the present invention are given hereinbelow.

EXAMPLE 1

A solution is prepared using 5.9 kg of a polybutadiene rubber in a mixture of monomers consisting of 61.7 kg of styrene, 21.75 kg of ethylbenzene and 17.3 kg of acrylonitrile.

Into the resulting solution the radical-forming polymerzation initiators are added, namely: 0.025 kg of benzoyl peroxide and 0.033 kg of tert.butyl perbenzoate.

The thus-prepared solution is fed, by means of a pump 6 with the capacity of 4 l/hr, to pre-polymerization into a 10 l reactor 1. The mass temperature during the pre-polymerization is maintained at 102° C. and conversion of the monomers is within the range of from 30 to 40%. The reaction mass is then fed, at the flow rate of the solution supply, to a 7 l polymerization reactor 2. In the reactor 2 the reaction mass is mixed in planes perpendicular to the axis of the polymerization reactor 2 and simultaneously moved upwardly as it is displaced by the pre-polymer supplied from the pre-polymerization reactor 1. Constant temperature of the reaction mass equal to 147° C. is obtained in the polymerization reactor 2 by adjusting temperature of the cooling agent supplied into heat-exchanging pipes 15 and jacket 14 of the reactor 2. The degree of conversion of the monomers in the reaction mass discharged from the reactor 2 is equal to 65%.

Then the reaction mass is fed into the reactor 3 for the final polymerization (capacity of the reactor is 2 l), wherein the degree of conversion of the monomers becomes as high as 75% at the temperature of 165° C.

The reaction mass leaving the reactor 3 of the final polymerization is then fed into a vessel 4 for the removal of the non-polymerized monomers and the solvent at a temperature within the range of from 220° to 230° C. under a pressure of from 15 to 20 mm Hg. The final product is discharged in the form of strands intended for a further granulation.

The process is carried out continuously over the period of 3 days; the copolymer properties during the polymerization remain constant; samples are taken after every 3 hours.

Conditions of the process and properties of the final product are shown in Table 2 hereinbelow.

EXAMPLE 2

The process is conducted in a manner similar to that described in the foregoing Example 1, except that in the preparation of a rubber solution in a mixture of monomers (styrene and acrylonitrile) and a solvent (ethylbenzene) use is made of 0.046 kg of benzoyl peroxide and 0.038 kg of tert. butyl perbenzoate (this mixture will hereinafter be referred as a feeding solution) and the supply rate of the feeding solution is maintained equal to 3 l/hr. The temperature is set and maintained constant: 90° C. in the pre-polymerization reactor 1; 130° C. in the polymerization reactor 2 and 160° C. in the reactor 3 of the final polymerization. Accordingly, degrees of conversion of the monomers are maintained equal to 32, 68 and 80% in respective reactors.

The process is carried out continuously for 3 days. The copolymer properties during the polymerization remain constant; samples are taken after every 3 hours. The process conditions and properties of the final product are shown in Table 2 hereinbelow.

EXAMPLE 3

The process is conducted following the manner described in Example 1 hereinabove, except that in the preparation of the feeding solution use is made of 0.079 kg of benzoyl peroxide and 0.008 kg of tert.butyl diperoxide. The supply rate of the feeding solution is maintained equal to 2.5 l/hr; temperature in the reactors is set and maintained equal to: 90°, 130° and 160° C. respectively; degrees of conversion of the monomers are equal to 36, 66 and 80% in respective reactors.

The process is carried out continuously over the period of 3 days. The copolymer properties during the polymerization remain constant; samples are taken after every 3 hours.

The process conditions and properties of the final product are shown in Table 2 hereinbelow.

EXAMPLE 4

The process is carried out in a manner similar to that described in Example 1 hereinbefore, except that in the preparation of the feeding solution use is made of 0.059 kg of benzoyl peroxide and 0.008 kg of tert.butyl diperoxide; the flow rate of the feeding solution is 3 l/hr, temperature in the reactors is maintained equal to: 90°, 125° and 160° C. respectively, and the degree of conversion of the monomers is equal to 25, 60 and 75% in respective reactors.

The process is carried out continuously over the period of 3 days. The copolymer properties during the polymerization remain constant; samples are taken after every 3 hours.

The process conditions and properties of the final product are shown in Table 2 hereinbelow.

EXAMPLE 5

The process is carried out in a manner similar to that described in Example 1 hereinbefore, except that in the preparation of the feeding solution use is made of 0.084 kg of benzoyl peroxide and 0.008 kg of tert.butyl diperoxide.

The flow rate of the feeding solution is equal to 2 l/hr, temperature in reactors is set and maintained equal to: 90°, 135° and 162° C. respectively; the degree of conversion of the monomers is equal to 40, 80 and 90% in respective reactors.

The process is conducted continuously over the period of 3 days. Properties of the copolymer during the polymerization remain constant; samples are taken after every 3 hours.

The process conditions and properties of the final product are shown in Table 2 hereinbelow.

Table 2

Parameters of the process for the preparation of an acrylonitrilebutadienestyrene copolymer and properties of the final product

| Example No. | Amount of initiator, kg | | | supply rate, l/hr | Temperature in reactors, °C | | | Conversion in reactors, % | | | Conversion of the final product, % |
|---|---|---|---|---|---|---|---|---|---|---|---|
| | benzoyl peroxide | tert.butyl diperoxide | tert.butyl perbenzoate | | 1 | 2 | 3 | 1 | 2 | 3 | |
| 1 | 0.025 | — | 0.033 | 4 | 105 | 147 | 165 | 32 | 65 | 75 | 80 |
| 2 | 0.046 | — | 0.038 | 3 | 90 | 130 | 160 | 32 | 73 | 80 | 90 |
| 3 | 0.079 | 0.008 | — | 2.5 | 90 | 130 | 160 | 36 | 71 | 80 | 94 |
| 4 | 0.059 | 0.008 | — | 3 | 90 | 125 | 160 | 25 | 60 | 75 | 88 |
| 5 | 0.084 | 0.008 | — | 2 | 90 | 135 | 162 | 40 | 80 | 90 | 95 |

| Composition of the final product, % | | | Ratio NAC/styrene | Physico-mechanical properties | | |
|---|---|---|---|---|---|---|
| polybutadiene | acrylonitrile (NAC) | styrene | | Izod impact strength, kgf.cm / cm.notch | Relative elongation, % | Melt index, g/10 min |
| theoretical, relative to the charge | | | | | | |
| 7 | 20.34 | 72.66 | 0.280 | | | |
| 8.5 | 20.07 | 71.43 | 0.281 | 10.5 | 15 | 17 |
| 7.7 | 20.07 | 72.23 | 0.278 | 8.6 | 12 | 14 |
| 7.4 | 20.45 | 72.45 | 0.283 | 9.2 | 39 | 16 |
| 7.9 | 19.32 | 72.78 | 0.265 | 6.9 | 54 | 11 |
| 7.4 | 19.68 | 72.92 | 0.269 | 6.3 | 38 | 19 |

Therefore, from the Examples and Table 2 showing the process parameters and properties of the resulting copolymers it follows that the method and apparatus for a continuous preparation of an acrylonitrilebutadienestyrene copolymer makes it possible to carry out the polymerization process at a constant temperature and conversion of the monomers.

The polymers prepared by the method according to the present invention feature relatively stable and rather high physico-mechanical properties.

In practice of the present invention the polymerization process features a high stability in maintaining a constant temperature and a composition of the reaction mass in the polymerization reactor.

No stagnation zones are observed in the polymerization reactor, nor adherence of the reaction mass to the surface of the structural members after 15-20 days of continuous operation of the apparatus.

It is to be understood that persons skilled in the art may introduce various modifications, without departing from the spirit and scope of the present invention, into the method and apparatus for a continuous preparation of an acrylonitrilebutadienestyrene copolymer which have been described hereinabove merely as a non-limiting illustrative example.

What is claimed is:

1. An apparatus for continuous preparation of acrylonitrilebutadienestyrene copolymer consisting of: means for providing a solution of rubber in a mixture of the monomers, viz, styrene and acrylonitrile; a pre-polymerization reactor for the preparation of the reaction mass from the rubber solution in the monomers; a reactor for polymerization of the reaction mass; a reactor for the final polymerization of the reaction mass; a vessel for the removal of the non-polymerized monomers from the reaction mass to give a melt of an acrylonitrilebutadienestyrene copolymer; said said means for providing solution, pre-polymerization reactor, polymerization reactor, final-polymerization reactor and the vessel for the removal of the non-polymerized monomers are on-stream mounted and communicating with each other by means of pipelines; said polymerization reactor consisting of a shell; heat-exchanging members located inside said shell; a means located in said shell for stirring the reaction mass; said means for stirring having: an elongated tube fixedly mounted coaxially with said shell and extending substantially the length thereof; at least one slot provided in said tube and extending over the entire length thereof; a stirring member located in said tube coaxially therewith and made in the form of a closed rotably mounted cylinder and extending the length thereof; a driving means for setting said stirring member into rotation; the internal surface of said shell and outer surface of said tube forming a cavity therebetween; at least one partition positioned between the internal surface of said shell and stirring member and passing through the middle of said at least one slot along the length thereof and intended for division of said cavity into a suction zone and a pumping zone to effect circulation of the reaction mass in said cavity, wherefore during rotation of said stirring member a repeated circulation of the reaction mass in said cavity is effected in planes perpendicular to the longitudinal axis of said shell.

* * * * *